(12) United States Patent
Fuhl et al.

(10) Patent No.: US 6,345,075 B1
(45) Date of Patent: *Feb. 5, 2002

(54) PROCESS AND DEVICE FOR THE INCREASE OF SUBSCRIBER CAPACITY IN A CELLULAR MOBILE RADIO NETWORK

(75) Inventors: Josef Fuhl; Ernst Bonek, both of Vienna (AT)

(73) Assignee: Telekom Austria Aktiengesellschaft, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 09/194,387

(22) PCT Filed: May 20, 1997

(86) PCT No.: PCT/AT97/00105

§ 371 Date: Feb. 18, 1999

§ 102(e) Date: Feb. 18, 1999

(87) PCT Pub. No.: WO97/44919

PCT Pub. Date: Nov. 27, 1997

(30) Foreign Application Priority Data

May 20, 1996  (AT) ................................................ 888/96

(51) Int. Cl.[7] .............................................. H04L 27/06
(52) U.S. Cl. ........................ 375/341; 375/347; 375/349; 708/304; 455/33.3; 455/63; 370/119; 342/359
(58) Field of Search ................................. 375/233, 341, 375/347, 348, 349; 708/304, 323, 316; 455/63, 33.3; 342/359, 378, 383; 370/95.1, 95.3, 119

(56) References Cited

U.S. PATENT DOCUMENTS 4,079,381 A  *  3/1978  Piesinger ............... 343/100 SA
5,353,307 A  * 10/1994  Lester et al. .................. 375/14
5,515,378 A  *  5/1996  Roy, III et al. ............. 370/95.1
5,592,490 A  *  1/1997  Barratt et al. ................ 370/310
5,608,409 A  *  3/1997  Rilling ........................ 342/380
6,064,703 A  *  5/2000  Cusani et al. ............... 375/349
6,094,167 A  *  7/2000  Fuhl et al. ................... 342/383
6,118,832 A  *  9/2000  Mayrargue et al. ......... 375/346

FOREIGN PATENT DOCUMENTS

EP        0 520 969 A2    12/1992
EP        0 540 387 A2     5/1993
WO        WO 95/22873      8/1995
WO        WO 95/26116      9/1995

* cited by examiner

Primary Examiner—Stephen Chin
Assistant Examiner—Dac V. Ha
(74) Attorney, Agent, or Firm—Herbert Dubno

(57) ABSTRACT

For each K subscriber of a cellular mobile radio network who is supplied with one and the same frequency and one and the same time slot a decision-feedback and therefore non-linear antenna pre-processing facility with a decision-feedback structure is used comprising forward filters backward filters and decision circuits for the adaptation of the antenna weighting factors, wherein the backward filters are adapted to the length of the processing window D of MLSE, and the output signals of the forward filters for the actual data detection are taken to the MLSE of the subscriber concerned, before the subtraction of the feedback component takes place. Each of the receiver structures similar to K can be adapted and operated independently from the other K-1 structures. A common vectorial MLSE for the common data detection of all K subscribers can be employed.

3 Claims, 3 Drawing Sheets

PROCESS AND DEVICE FOR THE INCREASE OF SUBSCRIBER CAPACITY IN A CELLULAR MOBILE RADIO NETWORK

TECHNICAL FIELD

The invention relates to a process for data transmission in a cellular mobile radio network in which at least one transmitter/receiver statuib a phase-controlled antenna group is provided which is supplied with a circuit for adaptively modifying the antenna signal weighting factors for producing a directional characteristic in which, for adaptation of the antenna signal weighting factors, a non-linear structure is used for antenna signal processing, whereby the nonlinear structure is comprised of a forward filter, a feedback filter and a decision circuit and the antenna signals initially are fed over the forward filter, then supplied to the decision circuit and from the decision circuit are fed via the feedback filter, whereafter the output signal of the feedback filter is subtracted from the output signal of the forward filter. It relates also to a device for data transmission in a cellular mobile radio network in which a phase-controlled antenna group is provided which, for achieving a directional characteristic, is provided with a circuit for the adaptive influencing of the antenna signal weighting factors and wherein a nonlinear structure is used for antenna signal processing in the adaptation of the antenna signal weighting factors whereby the nonlinear structure is comprised of a forward filter, a feedback filter and a decision circuit and the individual antennae are connected at the inputs of the forward filter, the output of the forward filter is connected to a subtracter whose output is connected with the input of the decision circuit, the output of the decision circuit is connected with the input of the backward filter and the output of the backward filter is connected with the second input of the subtracter.

With such a process or such a device, one obtains a phase control antenna group provided with a circuit for adaptively influencing the antenna weighting factors so that a directional characteristic is produced. This circuit includes as is conventional a mixer, a time and value discretizing of all of the received signals of the individual antennae of the antenna group as well as a signal processing circuit.

STATE OF THE ART

The limited availability of the electromagnetic spectrum on the one hand and the rapid increase of the number of mobile radio subscribers and services on the other has mandated efficient utilization of the network drivers for those frequency bands which are utilized. Since known access processes, like FDMA, TDMA and CDMA have already reached their capacity limits (e.g. in GSM, Global System for Mobile Communications) and microcells in municipal high population density areas as well as half rate coders for GSM are already in use, new efficient access processes are highly desired for capacity increase. Directionally resolved reception represents a promising new technology for increasing the range, reducing the common channel interference and reducing the frequency repetition spacing, and thereby increasing the subscriber capacity of a mobile radio network.

The increase in the range is of interest in lightly settled regions and also for large umbrella cells in which overflow traffic from subordinate microcells must be absorbed. A further interesting field of application is radio access for fixed network subscribers ("radio in the local loop", RLL, or "radio in the loop", RITL).

The common channel interference is known to be the limiting influencing factor for well developed cellular mobile radio networks.

Directionally resolved reception, in which a maximum of the directional diagram of the receiving antenna is in the incident direction of the desired signal (of a subscriber) and/or zero locations of this directional diagram lie in incident direction of interference signals, reduces the common channel interference. These interference signals are, for example, signals which either derive from other subscribers in the same cell or from subscribers in foreign (distal) cells. With this mode of operation it is possible to so reduce the frequency repetition spacing that in an extreme case, reuse of the same frequency is possible in a neighboring cell (channel group number equal to one).

For the increase of the subscriber capacity of a mobile radio network it is however also a possibility to service multiple subscribers at one and the same frequency and the same time slot in the same radio cell. The usual designation for this, SDMA, Space Division Multiple Access, is unprecise: it should be designated Angle Division Multiple Access.

With the processes proposed to date for the directionally resolved reception, the lower limit of the angular separation at which the process breaks down is a significant problem. In the ideal case this lower limit should be 0°.

When more than one subscriber in a radio cell is serviced at the same frequency and the same time slot, the desired signal of one subscriber becomes an interference signal for all other subscribers and vice versa. SDMA enables a proper separation of the individual subscriber signals and in connection therewith the detection of the signals associated with each subscriber.

The current state of the art is described for example in T. Bull, M. Barrett, R. Arnott, "Technology in Smart Antennas for Universal Advanced Mobile Infrastructure (TSUNAMI R2108)—Overview", Proc. RACE Mobile Telecommunications Summit, Cascais, Portugal, November 22–24, 1995, pp. 88–97; and in M. Tangemann, C. Hoeck, and R. Rheinschmitt, "Introducing Adaptive Array Antenna Concepts in Mobile Communication Systems", RACE Mobile Communications Workshop, May 17–19, 1994, Amsterdam, pp. 714–727.

Here a group antenna with variable directional characteristics is used in which there is separation of desired subscriber signals and interference signals (referred to in total also as "interference"). The signal from each individual antenna element of the group is mixed at a lower frequency (intermediate frequency IF or base band BB). These IF or BB signals as time-discrete and value-discrete signals are used as input parameters for an efficient optimizing algorithm. The algorithm which determines the directional characteristic through the adaptive effect of the antenna weighting factors is realized by a signal processor or the like. This algorithm is either a "temporal-reference" algorithm as has been described for example in S. Ratnavel, A. Paulraj and A. G. Constantinides "MMSE Space-Time Equalization for GSM Cellular Systems", Proc. Institute of Electrical and Electronics Engineers, IEEE, Vehicular Technology Conference 1996, VTC '96, Atlanta, Ga., pp. 331–335, E. Lindskog, A. Ahlen and Sternad, "Spatio-Temporal Equalization for Multipath Environments in Mobile Radio Applications", Proc. Institute of Electrical and Electronics Engineers, Vehicular Technology Conference 1995, VTC '95, Chicago, Ill., USA, Jul. 25–28, 1995 pp. 399–403, and O. Munoz and J. Fernandez, "Adaptive Arrays for Frequency Non-selective and Selective Channels", Proc.

EUSIPCO '94, European Conference for Signal Processing, Edinburgh, pp. 1536–1539 or a "spatial-reference" algorithm as is described for example in M. Haardt and J. A. Nossek, "Unitary ESPRIT: How to Obtain an Increased Estimation Accuracy with a Reduced Computational Burden", IEEE Trans. on Signal Processing, Bd. 43, Nr. 5, May 1995, pp. 1232–1242, R. Roy and R. Kailath, "ESPRIT"—Estimation of Signal Parameters via Rotational Invariance Techniques", IEEE Trans. Acoust., Speech, Signal Processing, Bd. 37, July 1989, pp. 984–995.

"Temporal-reference" algorithms rely on the (previous) recognition of a part of the signal, for example, an intentionally introduced training sequence for identification of the subscriber. In the Global System for Mobile Communications (GSM) such a standard is provided and service for the estimation of the radio channel or for the identification of the base station. By contrast thereto "spatial-reference" algorithms require no previous knowledge of the subscriber signals since these algorithms utilize the spatial-geometric arrangement of the individual antenna elements in the group.

The optimum reception process for detection of subscriber signals utilizes MLSE-detector (MLSE=maximum likelihood sequence estimation). The MLSE process is for example described in Lee/Messerschmitt, Digital Communication, pp. 271–278, Kluwer Academic Publishers, Dordrecht, Netherlands, 1st edition, 2nd print, 1990. MLSE detects a reception sequence in an optimum way, i.e. with the smallest possible bit error quota.

A combination of linear processing of the signals of the antenna elements and the MLSE is described in S. Ratnavel, A. Paulraj and A. G. Constantinides "MMSE Space-Time Equalization for GSM Cellular Systems", Proc. Institute of Electrical and Electronics Engineers, IEEE, Vehicular Technology Conference 1996, VTC '96, Atlanta, Ga., pp. 331–335.

The linear processing which is required by Ratnavel has a drawback that with limited angular separation (for example within the half antenna main lobe width) the partial signals which are split off by multipath propagation and time-delayed subscriber signals allow the system to function like a linear equalize in the time range. It is known, however, that linear equalizer structures are—because of intersymbol interference of multipath propagation (deep spectral zero locations in the transmission function) only very limitedly suitable for equalization of mobile radio channels.

All previous publications deal with a subscriber per frequency and time slot so for example also does "Spatio-Temporal Equalization for Multipath Environments in Mobile Radio Applications" of E. Lindskog, A. Ahlen and M. Sternad, 1995, IEEE.

In this document a process or a device of the type mentioned at the outset is described. Should the multiplicity of subscribers have to be serviced at one and the same frequency and the same time slot, additional arrangements are necessary.

DISCLOSURE OF THE INVENTION

The invention has as its object the increase in the subscriber capacity of a mobile radio network by direction-dependent reception. This is achieved, according to the invention by a process of the kind mentioned at the outset wherein for increasing the subscriber capacity in a cellular mobile radio network, a multiplicity (K) subscribers are supplied at one and the same frequency and one and the same time slot, for each of the K subscribers a nonlinear structure is provided or for all K subscribers a common nonlinear structure is provided which encompasses all service subscribers in a time multiplex process, for the present data detection, the output signal of the forward filter before subtraction of the output signal of the feedback filter is supplied to an MLSE, Maximum Likelihood Sequence Estimator, for the respective subscriber or to a common vectorial MLSE, whereby feedback filter is matched to the processing window length D of the MLSE or the MLSEs. This is further achieved according to the invention by a device of the kind mentioned at the outset wherein (see claim 3 without reference numerals).

Each of these K equivalent nonlinear structures can be adapted and operated independently from and in parallel with the other K-1 structures.

This process has the advantage that the capacity of a mobile radio network with a constant number of base station locations can be increased by a factor K (where K is of the order of magnitude of 2 to 5); that the antenna group required for the directionally resolved reception need be prepared only once for this; that for each subscriber the signals of the other subscriber which may involve same-channel interference for the first-mentioned subscriber, are eliminated by the forward filter; that excessive time dispersion (that which lies outside the processing window length of the MLSE detector) is also eliminated by the forward filter; that in consequence of the nonlinear adaptation of the antenna signal weighting, signals from the same directions or directions lying very closely together, can be optimally combined; and that conventional MLSE detectors, which today are already realized in GSM receivers, can be used for combination of the mutlipath signals of a subscriber.

With sufficient availability of signal processing capacity, a single MLSE can be used for the detection of the data for all serviced subscribers which allows a lucrative saving in the hardware cost. In addition, the decision feedback structure can be set for a sufficiently high cycling rate to allow all of the serviced subscribers to be handled by the time multiplex process. This means that one utilizes only a single hardware realization of the feedback structure. The vigorous development of the calculating capacity of conventional signal and microprocessors makes use thereof advantageous for such calculation-intensive processes and devices.

BRIEF DESCRIPTION OF THE DRAWING

The invention is further described in connection with the drawings. They show.

BEST MODE OF THE INVENTION

Figure 1:
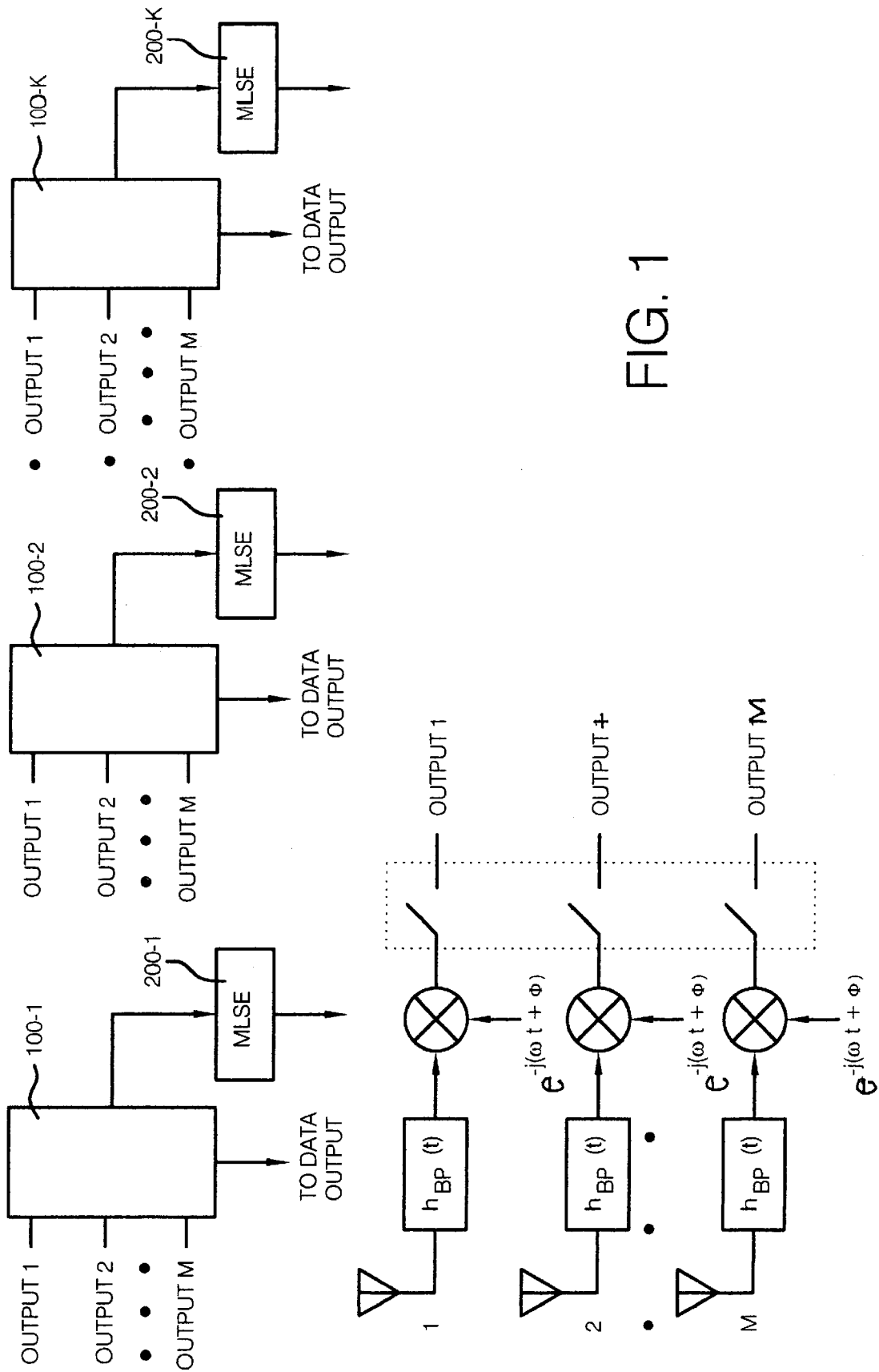
FIG. 1 a schematic diagram of the process and the associated receiver structure.
Figure 2:
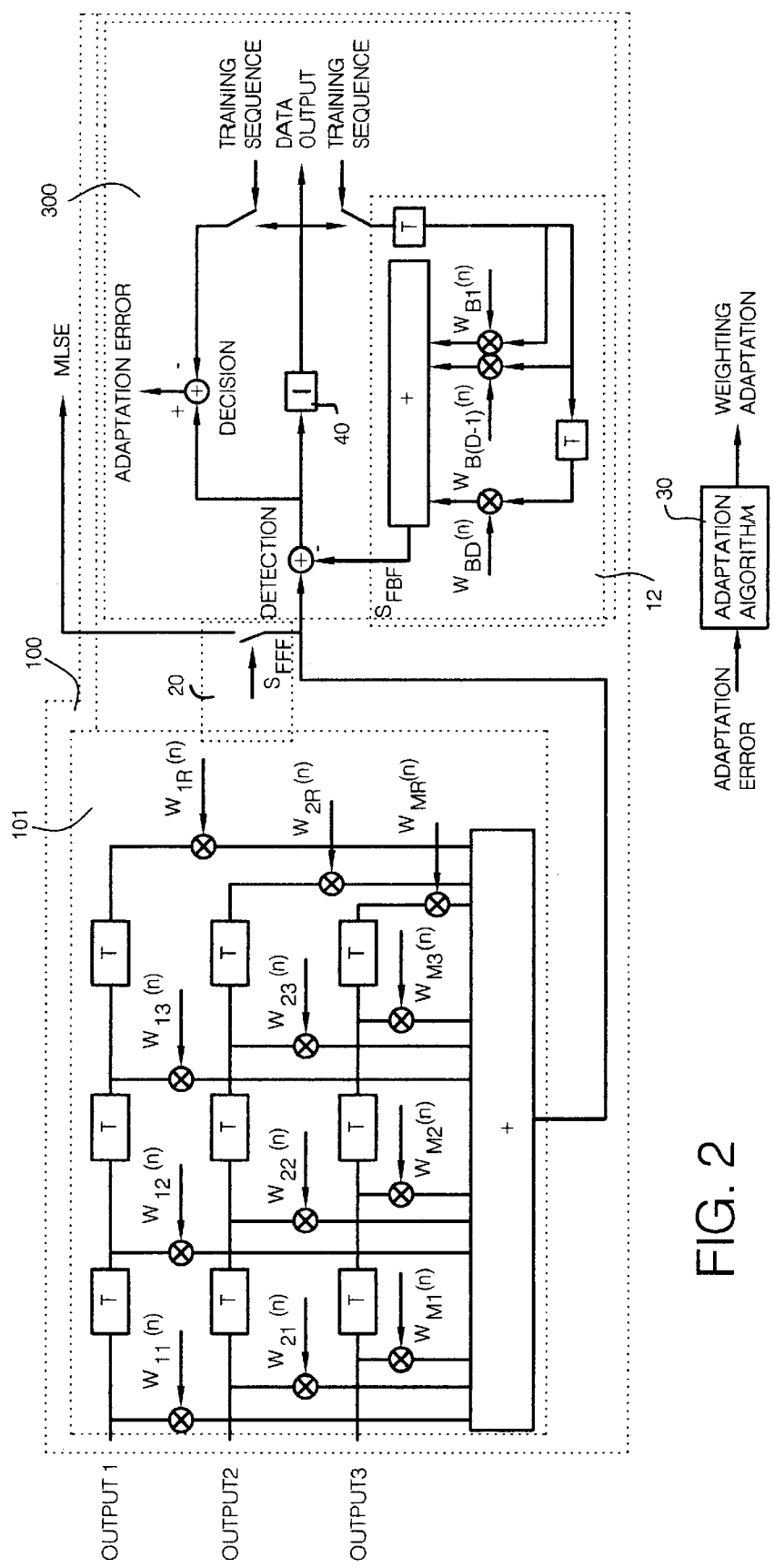
FIG. 2 shows one structure (100) in detail.

FIG. 1 shows a schematic diagram of the process and the associated receiver structure. It can have substantially identical structures 100-1, 100-2 . . . 100-K, which have only been symbolically indicated to simplify the drawing. The construction is visible from FIG. 2. When reference is made to a concrete element, this structure should be referred to and the reference character shown in FIG. 2 will be completed with a hyphen and a number which indicates the structure to which that element belongs; thus the feedback filter of the structure 100-2 is designated with reference character 12-2.

The antenna elements 1 to M are connected with the K forward filters 101-k characterized by their weighting factors $W_{11\text{-}k}$ to $W_{MR\text{-}k}$. K represents the number of subscribers in the same time slot and at the same frequency and k is a number between 1 and K. The bandpass filter placed following the antenna elements are characterized by their pulse response $h_{BP(t)}$. The elements designated at T effect a delay of the applied signals by the symbol duration T.

The signal $S_{FFF}$ produced by the forward filter 101 is fed to decision circuit 40. The latter decides whether each signal applied to its input which can contain noise and distortion, should be a logic 1 or a logic 0 and supplies the corresponding signal to its output. These clean signals are fed to a feedback filter 12. The feedback filters 12-k are respectively a common linear structure per subscriber with a length matched to the processing window length D of the MLSE 200-k or the plurality of MLSES. The signal $S_{FBF}$ from the feedback filter 12 is superimposed on the forward filter 101 signal $S_{FFF}$ and the two signals are in common supplied to the decision circuit 40.

The switches 20-k are set for data detection. The structure 300-K comprised of a decision circuit 40-K, and feedback filter 12-K are used during the data detection either for continuous adaptation of the antenna signal weights or are turned off. The adaption algorithm 30-k adapts the weighting factors $W_{11-k}$ to $W_{MR-k}$ for the forward filter 101-k and those ($W_{B1}$-k to $W_{BD-k}$) for the feedback filter 12-k. A known algorithm can be used for this purpose as described in S. Haykin, Adaptive Filter Theory, Prentice-Hall, Englewood Cliffs, N.J. 1986.

Figure 3:
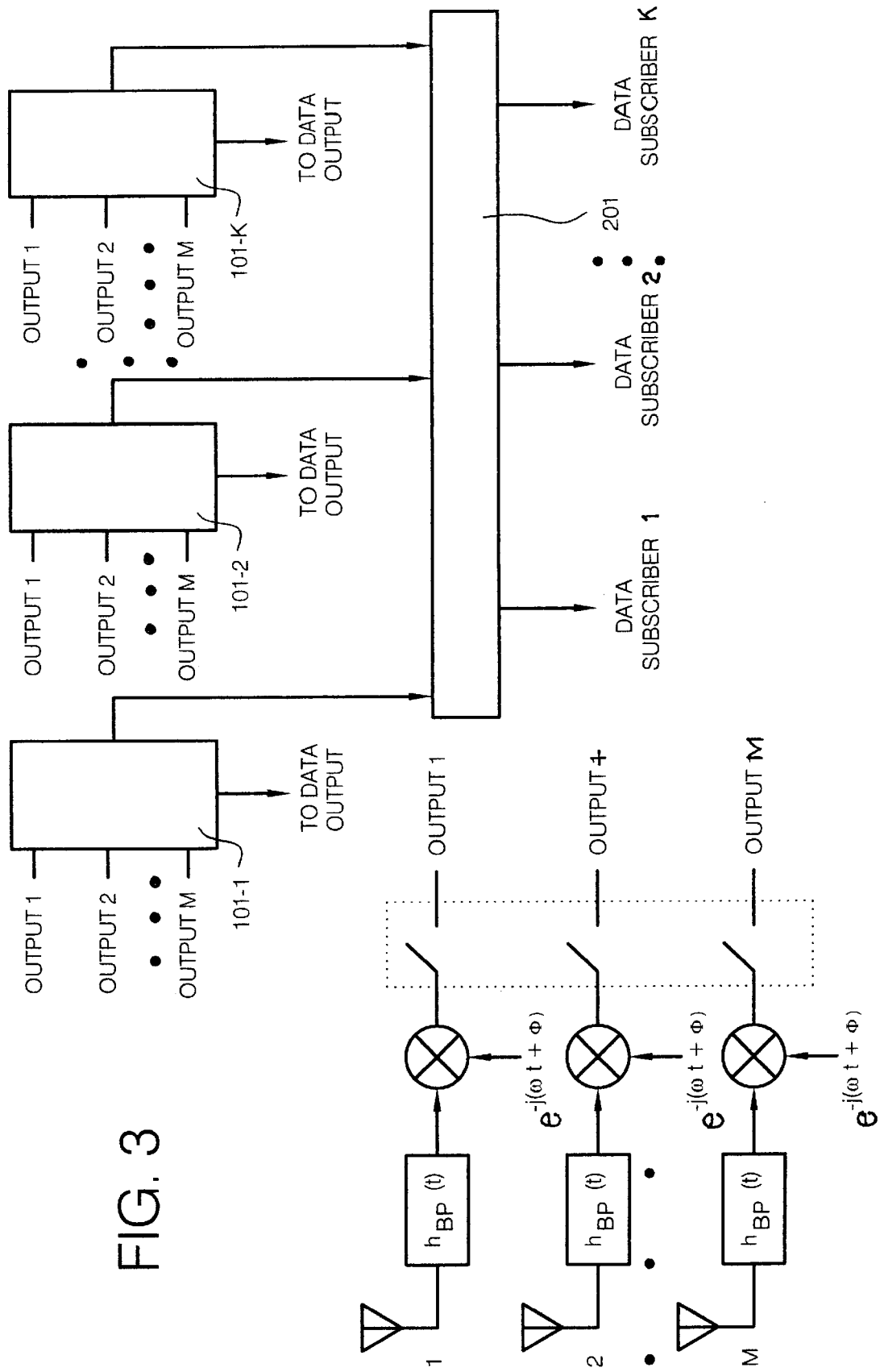
FIG. 3 shows a realization with a vectorial MLSE.

FIG. 3 describes the same receiver structure although with a single vectorial MLSE 201 for all K subscribers.

What is claimed is:

1. A process for data transmission in a cellular mobile radio network in which at least one transmitter/receiver station a phase-controlled antenna group is provided which is equipped with a circuit (30) for adaptively influencing the antenna signal weighting factors ($W_{11-k}$ to $W_{MR-k}$) for producing a directional characteristic and, for the adaptation of the antenna signal weighting factors ($W_{11-k}$ to $W_{MR-k}$) a nonlinear structure (100-k) is used for antenna signal processing whereby the nonlinear structure (100-k) is comprised of a forward filter (101-k), a feedback filter (12-k) and a decision circuit (40-k) and the antenna signals are initially fed via the forward filter (101-k) then fed to the decision circuit (40-k) and from the decision circuit (40-k) via the feed back filter (12-k), after which the output signal ($S_{FBF}$-k) of the feedback filter (120k) is subtracted from the output signal ($S_{FFF}$-k) of the forward filter (101-k), characterized in that for increasing the subscriber capacity in the cellular mobile network, a plurality (K) of subscribers are supplied in the cellular mobile radio network at one and the same frequency and one and the same time slot, where K is an integer, that for each K subscriber, a nonlinear structure (100-k) or for all K subscribers a common nonlinear structure is provided to which all serviced subscribers are treated in a time multiplex process, that for the actual data detection the output signal ($S_{FFF}$-k) of the forward filter (101-k) before subtraction of the output signal ($S_{FBF}$-k) of the feedback filter (12-k) is fed to an MLSE, Maximum Likelihood Sequence Estimation, (200-k) for each subscriber or to a common vectorial MLSE (201) whereby the feedback filter (12-k) is matched to the processing window length D of the MLSE (200-k) or vectorial MLSE (201), where D is an integer.

2. A process and device according to claim 1 characterized in that each of these K equivalent nonlinear structures (100-k) are adapted and driven in parallel and independent from the other K-1 structures are adapted and driven.

3. A device for data processing in a cellular mobile radio network in which a phase-controlled antenna group is provided which is equipped with a circuit (30) for adaptively influencing the antenna signal weighting factors ($W_{11-k}$ to $W_{MR-k}$) for producing a directional characteristic and where in the adaptation of the antenna signal weighting factors ($W_{11-k}$ to $W_{MR-k}$) a nonlinear structure (100-k) is used for antenna signaling processing, whereby the nonlinear structure (100-k) is comprised of a forward filter (101-k), a feedback filter (12-k) and a decision circuit (40-k) and the individual antenna are connected to the inputs of the forward filter, the outputs of the forward filter (101-k) are connected to a subtracter whose output is connected with the input of the decision circuit (40-k), whose output is connected with the input of the feedback filter (12-k) whose output is connected with the second input of the subscriber, characterized in that for increasing subscriber capacity in cellular mobile radio networks, a plurality (K) of subscribers are supplied at one and the same frequency and one and the same time slot, that for each of the plurality (K) of subscribers a nonlinear structure (100-k) is provided or for all K subscribers there is a common nonlinear structure which deals with all serviced subscribers in a time multiplex process where K is an integer, that for the actual data detection a MLSE, Maximum Likelihood Sequence Estimation, (200-k) for each subscriber or a common vectorial MLSE is provided to which the output of the forward filter is connected, whereby the feedback filter (12-k) or (200-k) is matched to the processing window length D of the MLSE (200-k) or the MLSE (201), where D is an integer.

* * * * *